Figure 1:
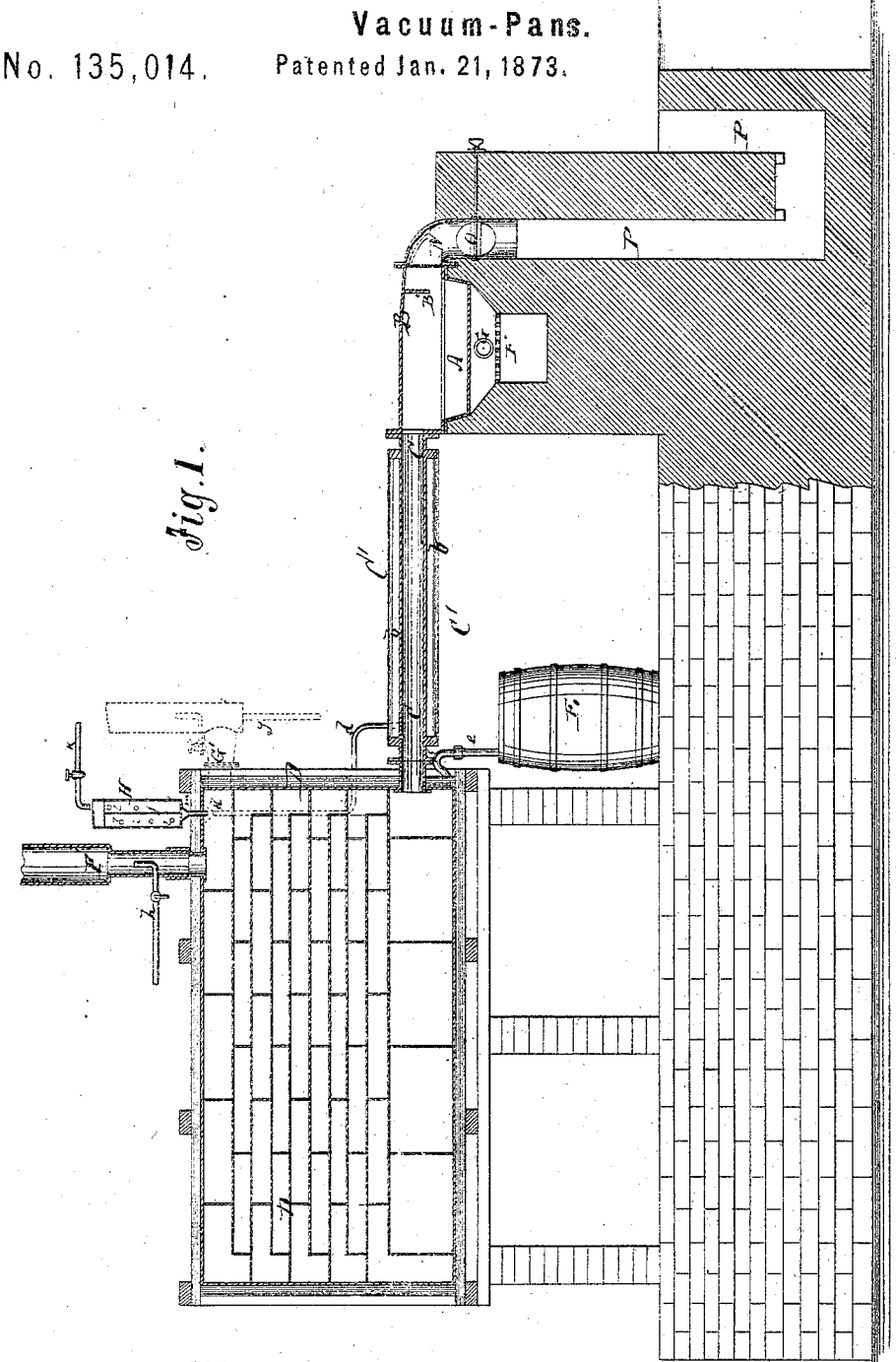

A. H. SEYFERTH.
Treating Sugar with Sulphurous Acid in the Vacuum-Pans.

No. 135,014. Patented Jan. 21, 1873.

Witnesses:
A Bennewendorf
Gustave Dieterich

Inventor:
Dr. A. H. Seyferth
Per Munn & Co
Attorneys.

A. H. SEYFERTH.
Treating Sugar with Sulphurous Acid in the Vacuum-Pans.
No. 135,014. Patented Jan. 21, 1873.
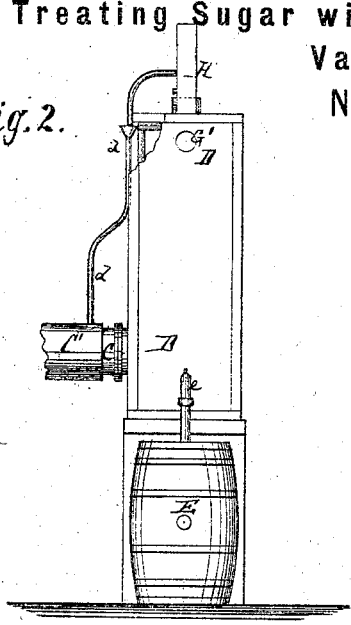
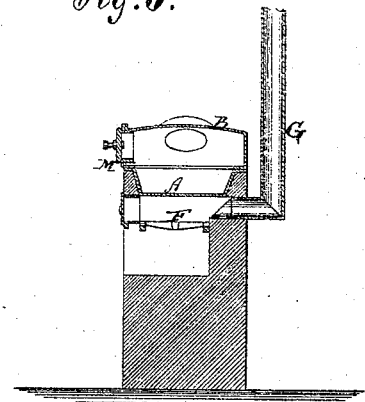
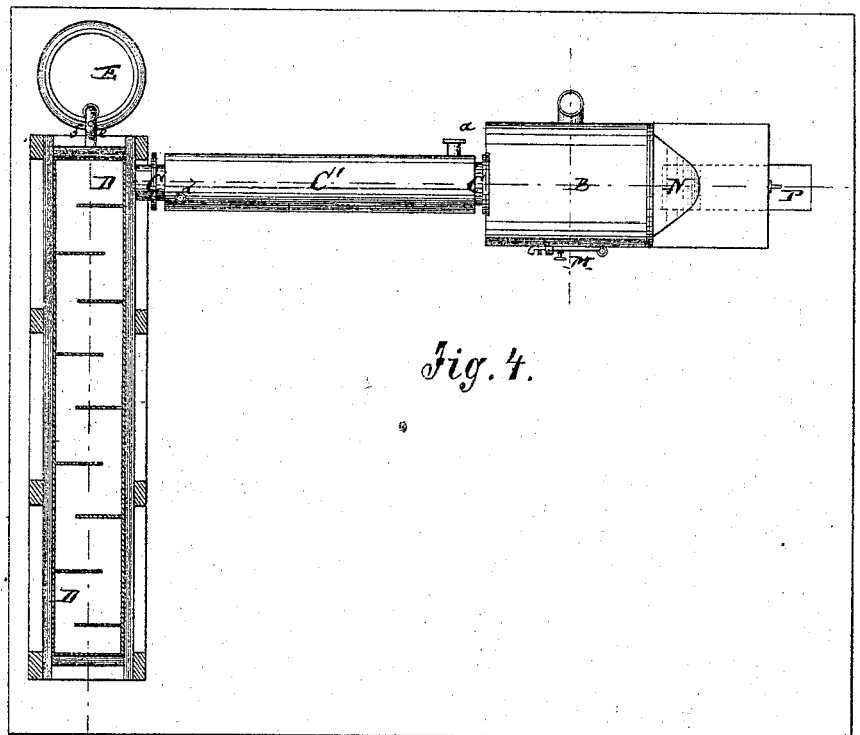

UNITED STATES PATENT OFFICE

AUGUSTUS H. SEYFERTH, OF BRUNSWICK, GERMANY.

IMPROVEMENT IN TREATING SUGAR WITH SULPHUROUS ACID IN THE VACUUM-PAN.

Specification forming part of Letters Patent No. 135,014, dated January 21, 1873.

*To all whom it may concern:*

Be it known that I, Dr. AUGUSTUS H. SEYFERTH, of Brunswick, in Germany, have invented a new and Improved Process of and Apparatus for Preparing a Solution of Sulphurous Acid and Applying it to Sugar Solutions and Sirups; and I do hereby declare that the following is a full, clear, and exact description thereof, which will enable others skilled in the art to make and use the same, reference being had to the accompanying drawing forming a part of this specification.

This invention relates to a new mode of producing diluted sulphurous acid, and to the application of sulphurous acid to sugar solutions and sirups for the purpose of neutralizing and removing the alkaline substances therein contained, and improving the color and taste of the same. The invention consists chiefly in the new process of applying the sulphurous acid to the sugar solutions or sirups while the same are in the vacuum apparatus or pan, the sulphurous acid being in the gaseous state or dissolved in water, so that all particles of the sugar solution can be penetrated by the acid, and the latter subsequently removed entirely, or so combined as to be harmless. The invention consists, also, in a new mode of producing the solution of sulphurous acid of any desired fixed strength, and in a new apparatus therefor, as hereinafter more fully set forth.

In the accompanying drawing, Figure 1 represents a vertical longitudinal section of my improved apparatus for preparing the aqueous solution of sulphurous acid. Fig. 2 is an end elevation of the condenser. Fig. 3 is a vertical transverse section of the furnace. Fig. 4 is a plan or top view, partly in section, of the apparatus.

Similar letters of reference indicate corresponding parts.

The furnace for preparing the sulphurous acid consists of a flat pan, A, Fig. 3, suspended by screws or other means from the dome B. Below the pan A is a small grate, F. G is the chimney for the escape of the products of the combustion on the grate. The dome B is provided with openings on three sides. The rear opening communicates with the pipe N, which contains a valve or damper, O, for regulating the amount of air admitted to the pan. The pipe N connects with the channel P, through which the air enters. This channel extends some distance below the level of the pan to prevent the escape through it of sulphurous acid in case the draft of the furnace should be insufficient at any time. A pendent rib, B', in the dome causes the ascending current of air to sweep down upon the surface of the burning sulphur in the pan. The door M serves for the introduction of the sulphur. It may be hermetically closed by a screw or other device. The cooling apparatus consists of a tube, C, which is surrounded by a jacket, C'. Between the tubes and the jacket flows a current of water for cooling the gases passing through C. A short pipe, $a$, projects from the jacket to be connected with a discharge-tube to carry away the water after it has become heated. Cold water is fed to the space $b$ between the jacket and the tube C by a pipe, $d$. The condenser D, to which the gases are conducted through the cooler, is a leaden box cased with wood. The interior contains a large number of horizontal channels, one above the other, through which, by the aid of vertical diaphragms, the sulphurous-acid gas is conducted back and forth. Cold water to absorb the gas flows through the condenser in a direction opposite to that pursued by the gas. The lower part of the condenser is sufficiently capacious to retain a considerable quantity of the sulphurous-acid solution, and thus serves as a receptacle for the product, from which it is delivered into barrels or other vessels by the U-tube or gooseneck $e$. The opening for the escape of the uncondensed gases is at F' or G'. The products which are conducted away consist, principally, of nitrogen from the air, air, and some sulphurous acid; they are of so low a temperature that the escape-pipe may be constructed of any material except zinc or iron. These uncondensed gases may be discharged into the air or into a chimney. It is important the velocity of the gases through the condenser should not be too great, but it must be sufficient to insure a steady combustion of the sulphur in the pan A. The movement of the gases depends upon the position of the furnace, the height of the chimney, and other evident conditions. To insure at all times a sufficient draft through the apparatus, steam-pipes $g$ or $h$ are applied to the discharge-tubes and fitted with steam-jets, and the tube G' is provided with a cock for discharging the condensed water. The supply of cold water to the apparatus is controlled by the regulator H. This regulator consists of a vessel with chambers $i$ and $j$, in which the water supplied to the tube $k$ passes through a sieve. The regulator has several openings or overflows, $l$ $l'$, &c., at different levels, which serve to fix the head of water, and thus regulate the flow into the condenser through the tube $m$. To one of these openings is attached a hose, which leads into the funnel on the pipe $a$ which supplies the cooler, the other overflow-openings being closed by cocks. At each of the overflow-openings is marked the number of pounds of sulphur which must be burned in twenty-four hours when it is in use in order to produce an acid solution of the standard strength—i. e., from one to one and a half per cent., or thereabout. The cock on the inlet-pipe $k$ must be regulated so that it shall not supply more water than can escape through the opening $m$ into the condenser and through the overflow into the cooler. Thus, while the sulphurous acid enters near the bottom of the condenser, at E, the water designed to absorb it enters at the top, at $m$.

To operate the apparatus a fire is lighted on the grate F; the pan A is charged with five or six pounds of sulphur; the overflow on the regulator corresponding to the combustion of any desired number of pounds of sulphur—say fifty pounds in twenty-four hours—is connected with the hose leading to the cooler, the other overflow-openings being closed. The supply of air to the burning sulphur is regulated by the damper in the channel. In from two to four hours the sulphur will have been nearly consumed, when more must be added. The draft of the furnace must be carefully regulated by the steam-jet in the discharge-pipe of the condenser and the damper of the air-channel, so that the quantity of sulphur consumed should correspond to the amount of water admitted to the condenser by the regulator.

A gas-jet may be employed in place of the fire on the grate for igniting the sulphur. As it is only necessary to heat the sulphur at the beginning of the operation the combustion of gas is very small.

In order to make use of the sulphurous acid for the purposes specified in this patent it is introduced into the evaporating apparatus together with the juice or sirup to be concentrated or purified. To facilitate the introduction of the sulphurous-acid solution, the vacuum-pan is provided with a tube, one end of which extends to the barrel or other vessel containing the supply of acid, while the other end enters the pan and discharges the acid at or near the bottom.

The juices and liquors employed in the first extraction of sugar from raw materials, as well as the sirups resulting from the refining processes, generally contain alkaline matters in variable quantities, either natural to the solutions or added during the treatment. The means hitherto employed for neutralizing these alkalies by acids have failed in practice for two reasons: first, because it was difficult to bring the acid into absolute contact with all the sugar in the solution; and, secondly, because the removal of the acid after the reaction was almost impossible. By introducing sulphurous acid, either in the gaseous form or in a weak solution, into the vacuum-pan, with the sugar solution or sirup, these difficulties are overcome, and a neutral solution is obtained practically free from alkalies and acids, and also properly decolorized. Sulphurous acid in the gaseous form or in aqueous solution has been applied by others; but it has never been introduced directly into the vacuum-pan and mixed in this apparatus with the solution of sugar sirup or molasses to be boiled.

I have found that if the sugar solution is agitated with a weak solution of sulphurous acid containing from one to one and a half per cent. of the acid no grape-sugar is formed, and after the water is evaporated no disagreeable taste is noticeable. I have also found that if one hundred parts of a concentrated sugar solution of from 36° to 42° Baumé is mixed with from three to ten parts of such a weak aqueous solution of sulphurous acid containing about one per cent. of acid, and the whole then thickened to the consistency of ordinary commercial sirup, the sulphurous acid will be completely evaporated, while the color will be improved to a greater degree than by the use of large quanties of bone-black hitherto employed.

In all solutions of sugar which contain lime and alkalies I find the sulphurous acid to effectually neutralize these substances, and to prevent their hurtful influence on the subsequent crystallization of the sugar. The solutions are more completely decolorized and acquire a better taste than when the same ends to be obtained are sought by the use of large masses of animal charcoal. Even the peculiarly offensive taste and odor of beet-root sirups can thus be eliminated.

The aqueous solution of sulphurous acid can also be applied with advantage to dilute solutions of sugar. The sugar solutions, juices, or weak sirups to be clarified are mixed with the sulphurous-acid solution, containing from one to one and a half per cent., or thereabout, of acid, in a suitable vessel, and then evaporated in the vacuum apparatus; or the two solutions may be drawn into the vacuum-pan simultaneously or successively, and thus evaporated. In the latter case the sulphurous-acid solution should be delivered at the bottom of the pan that it may mingle with the sugar solution before the gas can be separated from the water by the action of the heat or the vacuum; or, previous to the evaporation in the vacuum-pan, the proper quantity of sulphurous-acid gas can be introduced directly into the sugar solution to avoid the dilution which would be caused by the use of the weak aqueous solution. The quantity of sulphurous acid required for the various grades or qualities of sugar or sirup varies considerably and must be fixed by experiment; as it is a cheap agent and as a moderate excess is not injurious, the experiments may be made on the large scale in the vacuum-pan. The clear yellow color of the sugar solution or sirup is an indication that the sugar is sufficiently affected by the acid.

In practice I have found it desirable to use for every one hundred parts of concentrated sugar solutions or sirups of from 28° to 42° Baumé from three to fifteen parts of the sulphurous-acid solution of from one to one and a half per cent. of acid, or thereabout, the strength of the acid varying with circumstances.

One means of ascertaining when a sufficient quantity of the acid has been admitted to the sirup consists in drawing a sample from the pan and testing it with litmus paper, which will show whether the sirup has been completely neutralized by the acid. A slight excess of acid is not objectionable, as it is expelled during the evaporation.

Although the sulphurous acid can be advantageously applied during the clarifying processes before or after filtration, I prefer to apply it to the "green sirup" of the first product, and of the subsequent products, as these contain the larger proportions of alkalies. Sirups thus purified will be of better quality, the sugar will crystallize better and purer, and a larger percentage of crystallized sugar will be retained than when bone-black alone is employed. The taste of the sugar and of the sirup will be improved, and both will be ready for consumption without further treatment.

Having thus described my invention, what I claim as new, and desire to secure by Letters Patent, is—

1. The process herein described for producing a solution of sulphurous acid for use in the treatment of sugar solutions and sirups.

2. The apparatus herein described for producing a solution of sulphurous acid, consisting of the pan A, dome B, cooler C, condenser D, arranged with their respective appendages, substantially as set forth.

3. The subject-matter of the foregoing clause, in combination with the regulator H, as specified.

4. The process herein described for treating sugar solutions or sirups in the vacuum-pan with sulphurous acid, in the manner and for the purpose specified.

This description is made by me,

Dr. AUGUSTUS H. SEYFERTH.

Witnesses:
T. BARTHEL,
C. W. STEDGEL.